United States Patent
Eden et al.

(10) Patent No.: US 6,604,057 B1
(45) Date of Patent: Aug. 5, 2003

(54) EVALUATION METHOD FOR AN INDUCTIVE DISPLACEMENT SENSOR

(75) Inventors: Gerd Eden, Hage (DE); Jürgen Früh, Hannover (DE); Norbert Lissel, Barsinghausen (DE); Eike Lustfeld, Rehburg-Loccum (DE); Andreas Schäl, Nordstemmen (DE)

(73) Assignee: Wabco GmbH & Co. OHG, Hannover (DE)

( * ) Notice: Subject to any disclaimer, the term of this patent is extended or adjusted under 35 U.S.C. 154(b) by 0 days.

(21) Appl. No.: 09/550,083

(22) Filed: Apr. 14, 2000

(30) Foreign Application Priority Data

Apr. 26, 1999 (DE) .......................... 199 18 821

(51) Int. Cl.$^7$ .............................................. G01D 18/00
(52) U.S. Cl. .......................................... 702/104; 702/85
(58) Field of Search ............................ 74/335; 73/1.79; 192/30 W, 91 R; 324/207.16, 207.15, 207.12; 323/347; 336/115; 340/870.32, 870.35; 702/104

(56) References Cited

U.S. PATENT DOCUMENTS

| | | | | |
|---|---|---|---|---|
| 4,037,697 A | * | 7/1977 | Prenzel ...................... | 192/91 R |
| 4,358,762 A | * | 11/1982 | Wolf et al. ............. | 340/870.35 |
| 4,401,986 A | * | 8/1983 | Trenkler et al. ....... | 340/870.32 |
| 4,453,124 A | * | 6/1984 | Francis et al. ............... | 323/347 |
| 4,507,639 A | * | 3/1985 | Trenkler et al. ............ | 336/115 |
| 5,115,193 A | * | 5/1992 | Bean et al. ............. | 324/207.12 |
| 5,181,593 A | * | 1/1993 | Flotow et al. ............ | 192/30 W |
| 5,719,790 A | | 2/1998 | Lohrenz et al. | |
| 5,743,143 A | * | 4/1998 | Carpenter et al. ............. | 74/335 |
| 5,826,204 A | | 10/1998 | Ulm | |
| 5,848,383 A | * | 12/1998 | Yunus ........................ | 702/104 |
| 5,994,895 A | * | 11/1999 | Bolte et al. ............ | 324/207.16 |
| H1854 H | * | 7/2000 | Boston et al. ......... | 324/207.15 |
| 6,279,374 B1 | * | 8/2001 | Irokawa et al. .............. | 73/1.79 |

FOREIGN PATENT DOCUMENTS

| | | |
|---|---|---|
| DE | 30 07 747 A1 | 9/1981 |
| DE | 32 12 611 C2 | 3/1987 |
| DE | 37 14 993 A1 | 11/1988 |
| DE | 43 18 263 A1 | 1/1995 |
| DE | 4318263 | 1/1995 |
| DE | 43 40 719 A1 | 6/1995 |
| DE | 4340719 | 6/1995 |
| DE | 44 17 824 A1 | 11/1995 |
| DE | 4417824 | 11/1995 |
| DE | 4432881 | 3/1996 |
| DE | 44 32 881 A1 | 3/1996 |
| DE | 44 46 775 A1 | 6/1996 |
| DE | 9502858 | 7/1996 |
| DE | 195 33 505 A1 | 3/1997 |
| DE | 195 02 858 C1 | 2/1998 |
| DE | 197 003 359 A1 | 8/1998 |
| DE | 296 23 568 U1 | 11/1998 |
| EP | 1048931 A2 * | 2/2000 .......... G01D/3/028 |

* cited by examiner

Primary Examiner—John Barlow
Assistant Examiner—Douglas N Washburn
(74) Attorney, Agent, or Firm—Proskauer Rose LLP

(57) ABSTRACT

An evaluation method for an inductive displacement sensor first temperature-compensates a measured sensor value, and then calibrates same. The temperature compensation is carried out iteratively, utilizing two temperature dependent functions. The first function is based on the temprature-dependency of the measured sensor value, and the second function is based on the dependency of the temperature coefficient of the sensor model used. For a clutch sensor application, a calibration line is defined by two calibration points, which represent a completely engaged state and a just disengaged state, respectively. Continuous measurement of the displacement of an engaged clutch indicates the wear status of the clutch, so that a warning can be transmitted to the driver when the clutch lining has reached a predetermined thickness.

15 Claims, 5 Drawing Sheets

EVALUATION METHOD FOR AN INDUCTIVE DISPLACEMENT SENSOR

The present invention relates to an evaluation method for an inductive displacement sensor, and more particularly, to a method of determining a temperature-compensated measured value for a calibration of a displacement sensor.

An evaluation method of this type is described, for example, in DE-OS 43 18 263, the full contents of which are made the object of the present patent, and which discloses that the temperature ($T_{IST}$) is to be measured at the point of installation of the displacement sensor and the measured value is to be converted in an electronic evaluation system to a normal temperature $T_0$, e.g. 20° C., in order to compensate for the temperature dependency of the measured value of an inductive displacement sensor, according to the known formula:

$$S_{compensated} = \frac{S_{noncompensated}}{1 + m(T_{IST} - T_0)}$$

where the magnitudes are defined as follows:

$S_{compensated}$=temperature-compensated measured value $S_{noncompensated}$=non-temperature-compensated measured value m=temperature coefficient of the displacement sensor (slope of the temperature curve)

$T_{IST}$=sensor temperature $T_0$=normal temperature

If the fact that the temperature coefficient m depends on the armature position s is additionally taken into account, the temperature coefficient m can be calculated by means of a second function which reflects the anchor position dependency and which uses a term independent of temperature as an input variable. This approach requires iterative steps.

A displacement sensor which is provided for a clutch has the task of detecting the position of the clutch. Since the measured displacement values vary significantly with the temperature, such variations attributable to temperature must be compensated for. For such purpose, the compensation method of the type described above is suitable in principle.

Clutch sensors present a particular challenge in that the spread of the measured displacement values due to the temperature fluctuations is in the same order of magnitude as the unavoidable displacement tolerances which occur when the sensor is installed. Consequently, these displacement tolerances cannot be eliminated by means of the temperature compensation method mentioned above.

It is therefore the object of the present invention to expand the sensor evaluation method of the patent application mentioned initially such that it is also suitable for application to a clutch sensor.

SUMMARY OF THE INVENTION

In accordance with this and other objects of the invention, there is provided a method of determining a temperature-compensated measured value for calibration of a displacement sensor, designed as an inductive displacement sensor, in accordance with which the displacement sensor temperature and/or an environmental temperature thereof is measured in order to obtain a measured temperature. A measured sensor value is determined which applies at such measured temperature. The method further involves determining a temperature coefficient, which is at first unknown, by using a first function and a second function, the first function being based on the temperature-dependency of the measured sensor value, and the second function being based on the known dependency of the sensor temperature coefficient on the measured sensor value at a reference temperature. This dependency relates to a sensor model, and the determination of the temperature coefficient includes solving the two functions using iteration. The measured sensor value is then temperature-compensated to form a temperature-compensated measured sensor value by converting the measured sensor value into the measured sensor value applicable at the reference temperature using the temperature coefficient applicable to the sensor and the temperature difference between the measured temperature and the reference temperature. Such temperature-compensated measured sensor value is converted into a measured value with a mechanical length unit through calibration.

The invention provides the advantage that no hardware devices are required for its implementation, which would increase cost, with the exception of a memory expansion which might perhaps be necessary at marginal cost, since the sensor evaluation method is carried out by a program.

A further development of the invention provides the advantage that the calibration according to the invention need only be carried out once, i.e., at the initial utilization of a (new) vehicle clutch.

Another further development of the invention makes it possible to adjust the state of the fully engaged clutch. The previously known method cannot be used for a clutch, and can only be used with TARGET positions that can be permanently predetermined.

Another further development of the invention provides the advantage that a warning can be issued to the driver in the course of vehicle operation when the clutch lining no longer has a given remaining lining thickness. In such manner, the embodiment of the invention provides the concomitant benefit that a clutch can be replaced in a timely manner, before destruction of said clutch, while a premature replacement of a clutch is avoided when it could still further perform, for example, for another 100,000 km of vehicle operation.

Another further development provides the advantage that iterative calculation methods which are used are carried out at non-critical times, and the result is stored so as to be available at critical times without delay and without stress on the computer.

Another further development provides the advantage that the recognition of the state of the sufficiently disengaged clutch can be ascertained very easily and independently from the state of wear, in order to shift through a partially or fully automatic transmission gearshift.

The above, and other objects, features and advantages of the present invention will become apparent from the following description read in conjunction with the accompanying drawings in which like reference numerals designate the same elements.

DETAILED DESCRIPTION OF THE PREFERRED EMBODIMENT

Inductive displacement sensors are simple in design, provide reliable operation, and are therefore often used, for example, in vehicles. They consist of a coil in which an iron core is displaceably located. The position of the iron core is detected by the inductance of the coil which is thereby changed as a result of relative displacement of the core.

Figure 6:
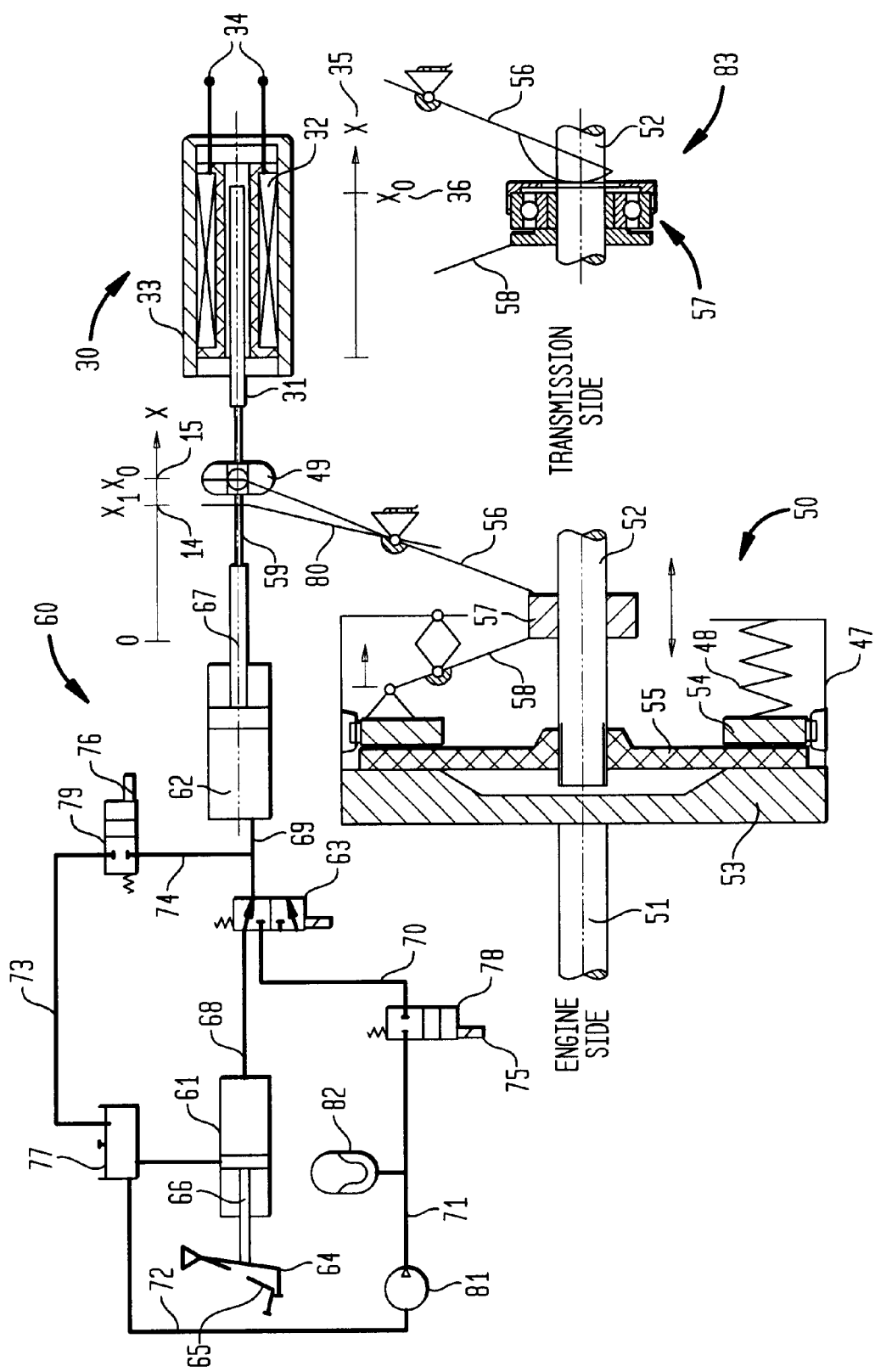
FIG. 6 is a schematic representation of a clutch with an hydraulic disengagement device and an inductive displacement sensor to determine the clutch actuation displacement.

An inductive displacement sensor of this type is shown in FIG. 6, designated by the numeral 30. It consists essentially of an iron core 31 which is located in a coil 32 such that it can be displaced. A cupping yoke 33 made of a ferromagnetic material is provided for the return of the magnetic field. The coil ends are brought out in the form of connections 34.

The displacement sensor 30 is fixedly attached to the vehicle and the entry depth (x) 35 of the iron core 31 into the coil 32 represents the displacement to be measured.

The connections 34 of the displacement sensor 30 are connected to an electronic circuit (not shown) for the evaluation of the displacement. A circuit for such an evaluating device is known, for example, from DE-OS 37'14 993.

The inductance L of the displacement sensor, which depends on the displacement to be measured, is in this case part of a Wheatstone bridge ($R_1$, $R_2$, $R_3$, L). A switch S is assigned to the inductance L, and the bridge voltage UA is monitored by a comparator OP. A microcomputer MC calculates the time T between the actuation of the switch and the zero passage of the bridge voltage UA. The time T is proportional to the value of the inductivity inductance L, but independent of the value of the supply voltage ($U_E$). Due to the above-described dependency of the displacement, the time ascertained according to the measuring method of this electronic evaluating device also represents a measure for the entry depth of the iron core into the coil. The time is nearly proportional to the displacement to be measured (the influence of marginal fields prevents an exact proportionality).

The known measured-value method thus provides a measured sensor value $t_S$ corresponding to the current displacement. The measured value $t_S$ which is determined applies at the temperature at which the measurement was taken.

The measured temperature $\vartheta$, which is either the temperature of the displacement sensor itself or the temperature in the immediate environment of the displacement sensor, or which represents a temperature value at which the displacement sensor temperature as well as the environmental temperature is taken into account, is ascertained, in this case by a temperature sensor or by measuring the temperature-dependent ohmic resistance of the coil 32. For that which follows, the measured temperature $\vartheta$ is assumed to be known.

Since the temperature coefficient of the measured sensor value, which is in an order of magnitude of approximately $1°/_\infty/°$ K to approximately $3°/_\infty/°$ K, represents a considerable influence parameter, the measured value $t_S(\vartheta)$ as such can still not be utilized for further processing.

For further processing, the measured sensor value $t_S$ must first be compensated for in a first step, i.e., it must be converted to a measured sensor value $t_S$ at which a reference temperature $\vartheta_B$ is given. Assuming a temperature coefficient $T_K$ (linear temperature dependency) the known relationship between the measured sensor value $t_S(\vartheta)$ at the measured temperature $\vartheta$ and the measured sensor value $t_S(\vartheta_B)$ at the reference temperature $\vartheta_B$ results as follows:

$$t_S(\vartheta) = t_S(\vartheta_B) * (1 + T_K (\vartheta - \vartheta_B)) \tag{1}$$

For further processing, a resolution is made according to the measured sensor value at the reference temperature, whereby a first function is formed:

$$t_S(\vartheta_B) = \frac{t_S(\vartheta)}{1 + T_K(\vartheta - \vartheta_B)} = f_1(T_K) \tag{2}$$

The value $t_S(\vartheta_B)$ which is being sought cannot, however, be defined completely with the equation (2), since although the temperature $\vartheta$ of the measurement, the reference temperature $\vartheta_B$ and the measured sensor value $t_S(\vartheta)$ on the right side of the equation are known, the temperature coefficient $T_K$ itself is unknown.

Figure 1:
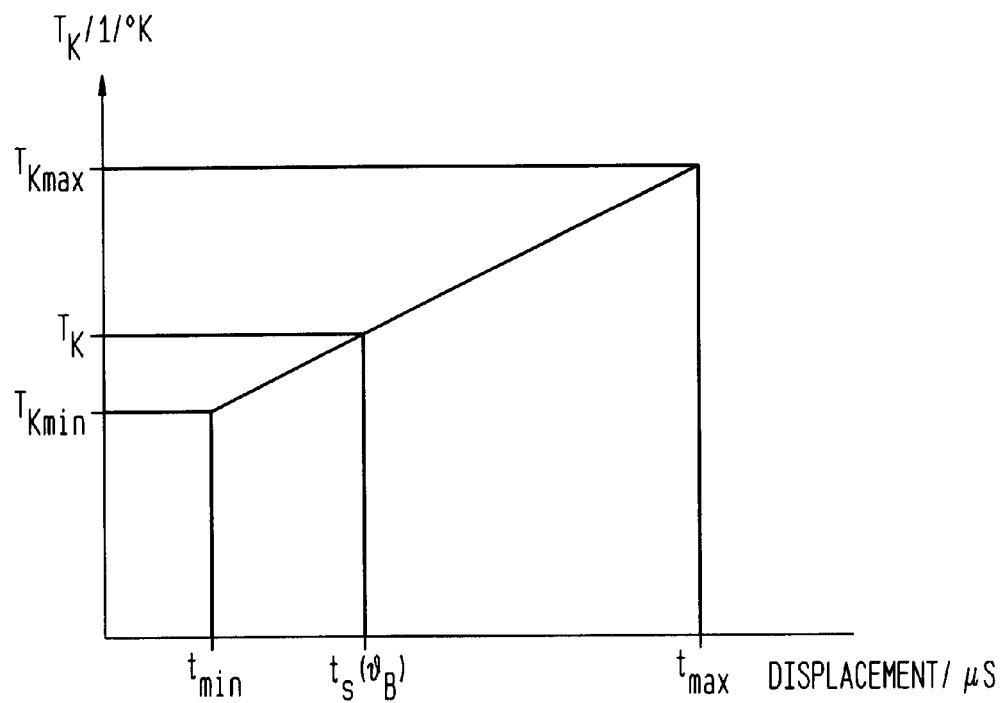
FIG. 1 is a graph showing the evolution of the temperature coefficient of an inductive displacement sensor as a function of the displacement.

The dependency of the temperature coefficient $T_K$ on the measured sensor value at the reference temperature $\vartheta_B$, which is shown in FIG. 1, is however known.

In this case:

$t_{min}$ is the smallest possible measured sensor value at $\vartheta_B$ $t_{max}$ is the largest possible measured sensor value at $\vartheta_B$ $t_S(\vartheta_B)$ is the measured sensor value at the reference temperature $T_{Kmin}$ is the temperature coefficient for $t_{min}$ $T_{Kmax}$ is the temperature coefficient for $t_{max}$ $T_K$ is the unknown temperature coefficient.

In principle, any desired fixed temperature can be selected as the reference temperature $\vartheta_B$ at which the parameters $t_{min}$, $t_{max}$, $T_{Kmin}$ and $T_{Kmax}$ are determined. Normally, however, the reference temperature is set at $\vartheta_B = 20°$ C.

The curve according to FIG. 1 applies to a specific sensor type. Experience shows that the curve closely approaches a straight segment with constantly rising pitch M:

$$M = \frac{T_{Kmax} - T_{Kmin}}{t_{max} - t_{min}} \tag{3}$$

Taking the known values $t_{min}$, $t_{max}$, $T_{Kmin}$ and $T_{Kmax}$ as a basis, a specific number value is found for the rising slope M.

Applied to the two points $T_K|t_S(\vartheta_B)$ and $T_K|t_{min}$, the following equation also applies to the rising slope M:

$$M = \frac{T_K - T_{kmin}}{t_S(\vartheta) - t_{min}} \tag{4}$$

From this equation, a second function results through solution according to the temperature coefficients:

$$T_K = M(t_S(\vartheta_B) - t_{min}) + T_{Kmin} = f_2(t_S(\vartheta_B)) \tag{5}$$

The equation (2) for the first function and the equation (5) for the second function thus represent two equations for two unknowns, $T_K$ and $t_S(\vartheta_B)$. Combing them leads to a quadratic equation according to which the unknown values can be determined (by analytic solution).

In electronic controls where measured sensor values are processed, a word length of 8 bit (1 byte) is prescribed in many applications. For this type of micro-controller, the analytic solution of a quadratic equation is not suitable, for example, because the calculation of the square root involved with this requires an inordinate amount of calculation time.

Instead of an analytical solution of the equation, the method according to the invention takes a different approach, by conducting the calculation in the form of an approximation process in a "compensation calculation" program segment with iterative loops which are stopped when a specific, predetermined minimum precision has been reached.

Figure 2:
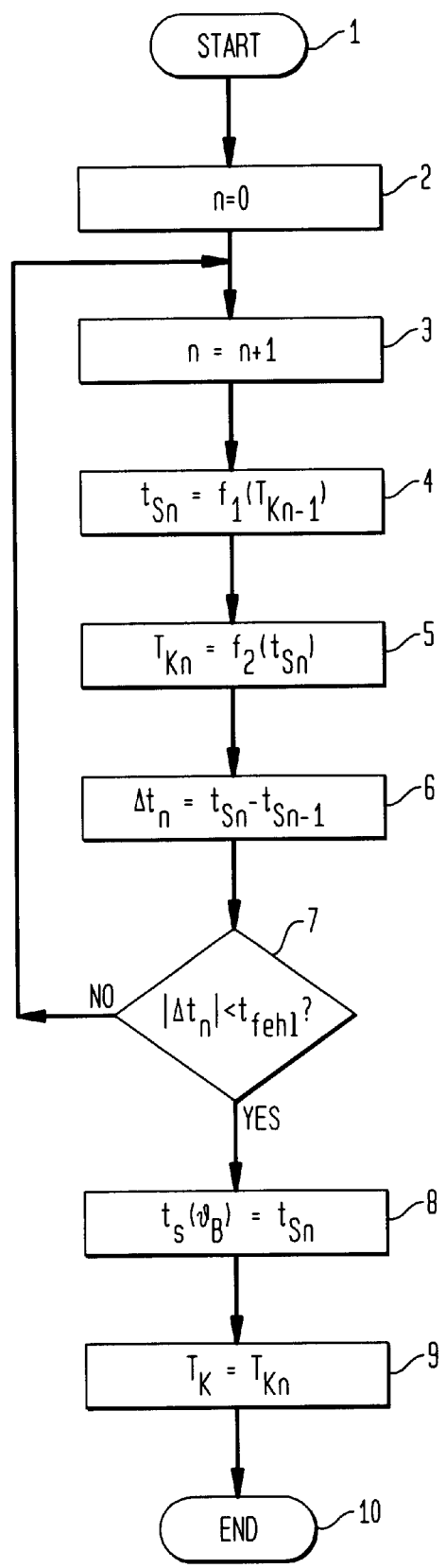
FIG. 2 is a flow-chart for determining the temperature-compensated measured sensor value.

In FIG. 2, the program segment "compensation calculation" is depicted as a flow-chart.

As shown in FIG. 2, after the start 1, a cycle counter is initialized in step 2, and in step 3, which is also reached from the conditional branch back from step 7, the cycle counter is incremented by 1. The cycle counter is therefore given the number 1 in the first loop, the number 2 in the second loop, etc. By extrapolation, it is given the number n in the nth loop.

In step 4, the measured sensor value $t_S(\vartheta)$ is corrected for the first time by forming a value $t_{Sn}$. In the first loop it is a value $t_{S1}$, in the second loop a value $t_{S2}$, etc., in the extrapolation of the nth loop it is the value $t_{Sn}$. The first function $f_1(T_{Kn-1})$ represents, as explained, the function according to equation (2). For the $T_K$ value, the value is first used formally in step 4, which has resulted in the preceding loop n−1 according to the step 5 which is explained below. However since no $T_K$ valued exists from a preceding loop in the special case of first loop passage, the $T_K$ uses for the first time here the median value of the temperature coefficients $T_{Kmax}$ and $T_{Kmin}$, which were discussed earlier in connection with FIG. 1 (this median value represents a temperature coefficient assumed to be suitable). In step 5, the $T_{Kn}$ value of this loop run-through is found by using the value $t_{Sn}$ according to step 4 in the equation (5), the second function $f_2(t_{Sn})$ In step 6, the difference $\Delta t_n$ of the compensated measured value $t_{Sn}$ is formed in accordance with the then current and the compensated measured value $t_{Sn}-1$ from the previous loop run-through (in the special case of first loop run-through, $t_{S0}$ is set to zero. In step 7, a verification is made whether a break-off criterion has been reached, i.e., whether the amount of the difference $\Delta t_n$ according to step 6 is smaller than a predetermined minimum $t_{fehl}$ (break-off criterion: differentiation relating to the last calculation by less than a predetermined magnitude). If this is not the case, the program jumps back to step 3, so that at least one additional iteration loop is executed. If the maximum error $t_{fehl}$ is not reached after a number of iteration loops according to step 7, no additional iteration runs are executed. Instead, the measured value $t_S$ at the reference temperature is set in step 8 to the value $t_{Sn}$ which has resulted in this iteration loop, and in step 9, the applicable $T_K$ is set to the value $T_{Kn}$ of that loop. With step 10, the end of the program segment "compensation calculation" is reached.

In addition, it should be noted that the break-off criterion can of course be used also for the differentiation of the temperature coefficient since its last cycle, or for the differentiation of temperature coefficient, as well as the measured value.

With the formation of the temperature-compensated measured sensor value $t_S(\vartheta_B)$, the influence of the temperature is eliminated, such that this value now only depends upon the displacement.

The value resides in the "counts", i.e., in computer counting units (number as multiple of a time unit, therefore normalized time value, wherein the.time unit is, for example, 1 µs) and can now be calibrated in a second step of the further processing, i.e., it can be converted into a suitable mechanical length unit, which normally is in millimeters.

According to the applicable linear relationship,)a calibration line is determined which is defined by two calibration points. The calibration line applies to a given unit of a sensor type and must be determined empirically for this type.

In order to simplify the designations, a value of a measured sensor value $t_S$ that is converted according to the "compensation calculation" method will hereinafter be marked with an asterisk *:

$$t^*_S = t_S(\vartheta_B) \tag{10}$$

Figure 3:
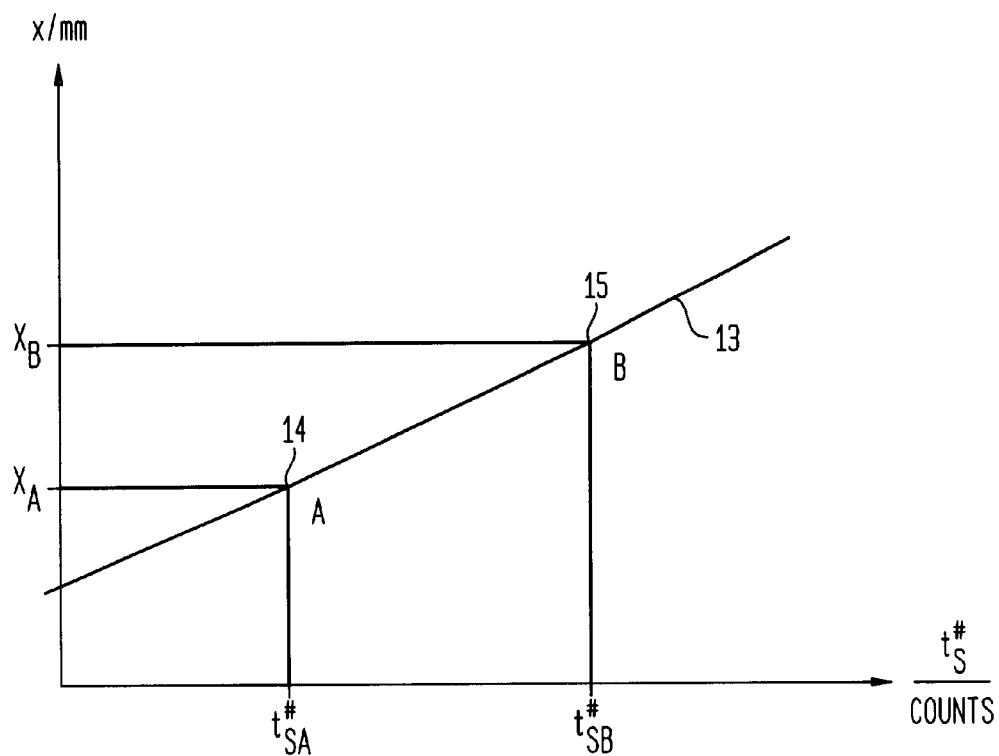
FIG. 3 is a graph showing a calibration line defined by two calibration points as a function of the temperature-compensated measured sensor value.

The calibration line 13 defined on the bases of the mentioned two calibration points, i.e., a first calibration point 14 and a second calibration point 15, is represented in FIG. 3 in this simplified manner of designation. The compensated measured value $t^*_S$ is entered on the abscissa of FIG. 3 as an independent variable, and the dependent variable of the ordinate shows the measured value x in millimeters. With the coordinates $X_A|t^*_{SA}$ for the first calibration point (A) 14 and the coordinates $X_B|t^*_{SB}$ for the second calibration point (B) 15, the result for the rising slope $m_E$ of the calibration line 13 is:

$$m_E = (x_B - x_A)/(t^*_{SB} - t^*_{SA}) \tag{11}$$

The calibration line (13) is thereby determined by:

$$x = m_E(t^*_S - t^*_{SA}) + x_A \tag{12}$$

The first calibration point (A) 14 and the second calibration point (B) 15 can be in principle selected as desired. As explained below, for such purpose, it is advisable to designate two very clearly defined calibration points.

Figure 4:
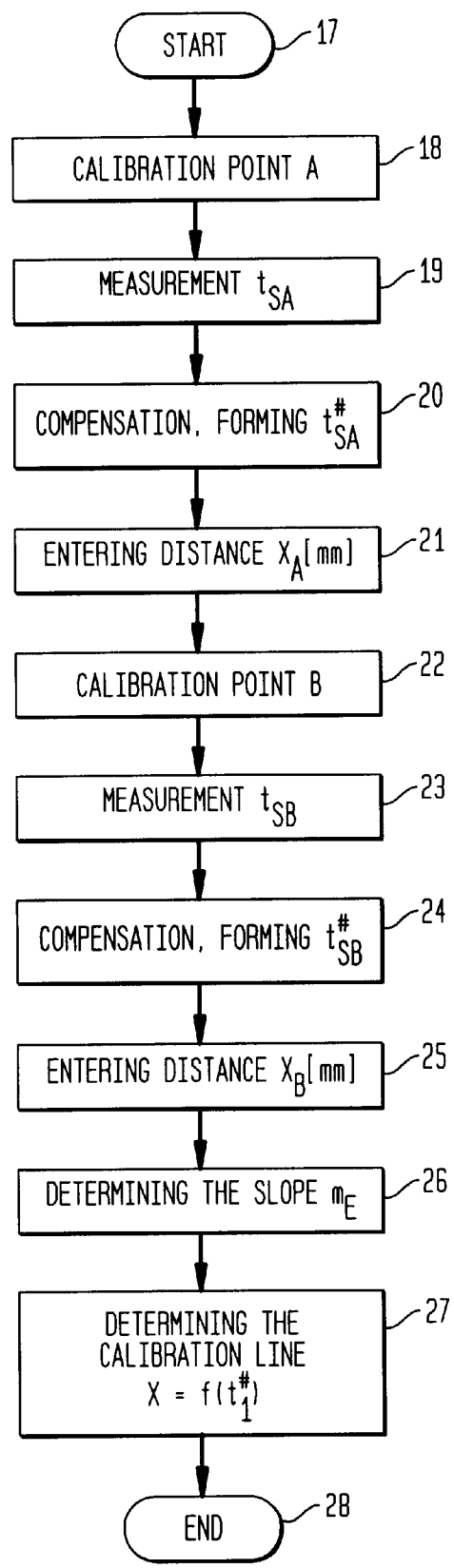
FIG. 4 is a flow-chart for the determination of the calibration line.

In the flowchart for the calibration according to FIG. 4, following the start 17, the first calibration point (A) 14 is set in step 18 through suitable adjustment. In step 19, the sensor measurement is carried out, whereby the uncompensated measured sensor value $t_{SA}$ is found (at a temperature $\vartheta$). In step 20, this measured value is temperature-compensated according to the explained method of "compensation calculation," resulting in the value $t^*_{SA}$. In step 21, the displacement value in millimeters of the first calibration point (A) 14 is entered. The value $x_A$ is measured in relation to the selected zero point and is entered to inform the electronic computing unit which is part of the evaluation system.

Steps 18 to 21 for the first calibration point (A) 14 are repeated in similar steps 22 to 25 for the second calibration point (B) 15. As a result, and with the completion of step 24, the coordinates of the first 14 and second 15 calibration point according to FIG. 3 as discussed earlier are stored in the computing unit. In step 25, these coordinates are used to determine the rising slope $m_E$ of the calibration line according to equation (11), and this is followed by step 26 with the determination of the calibration line according to equation (12). The calibration is completed with step 28. The calibration line 13 according to FIG. 3 is defined in absolute numbers. As a result, a temperature-compensated, absolute measured displacement value in millimeters can be associated with every measured sensor value.

As shown schematically in FIG. 6, a clutch 50 is normally provided between the outgoing shaft 51 of the vehicle engine and the ingoing shaft 52 of the transmission. A first friction plate 53, for example, structurally made in one piece with the flywheel, is interlockingly connected to the outgoing shaft 51 of the engine, and the coupling disk 55 is non-rotatably, but displaceably, connected to the ingoing shaft of the transmission. In the clutch housing, in the form of a bell 47 which rotates together with the first friction plate 53, a second friction plate 54 is suspended so as to be non-rotatable relative to the bell 47, but capable of displacement. The previously mentioned coupling disk 55 is located between the friction plates 53 and 54, and is equipped with friction linings of a given overall thickness D (in millimeters). In the engaged state (clutch closed) the second friction plate 54 presses on the coupling disk 55 and on the first friction plate 53 with a force that is predetermined by the spring 48, such that a torque of a certain magnitude caused by friction can be transmitted between the outgoing engine shaft 51 and the ingoing transmission shaft 52.

When the disengagement mechanism is actuated via the disengagement lever 56, a disengagement bearing 57, which can be displaced on the transmission ingoing shaft 52, is displaced, whereby the inner levers 58 press against one of the bearing rings of said disengagement bearing and the disengagement lever 56 presses against its other bearing ring. As a result, the above-mentioned force with which the second friction plate 54 presses on the coupling disk 55 and on the first friction plate 53 is reduced, so that as a result, only a reduced torque caused by friction can be transmitted from the shaft 51 to the shaft 52, and the clutch enters the slipping range.

Thus, the clutch is brought into the slipping range in the event of a certain displacement of the disengagement bearing 57. If the disengagement bearing 57 is pushed further to the left, beyond its position corresponding to the slippage range of the clutch, as shown in FIG. 6, the second friction plate 54 lifts off from the friction lining of the coupling disk 55, such that the interlocking connection between the outgoing shaft of the engine and the ingoing shaft of the transmission is broken, and the clutch is then in a completely disengaged state (clutch totally open). This state is shown in FIG. 6.

In this embodiment, a first measured displacement value for the closed clutch (clutch in) represents in its engaged state the possibility of transmitting the maximum torque, and a second measured displacement value represents the completed beginning of the disengagement state of the clutch (clutch open), i.e., the clutch has been disengaged so far that certainly no slipping of the coupling exists any longer, and therefore no torque is transmitted.

The temperature-compensated measured value of the first measured displacement value is designated hereinafter as $t^*_{SZ}$, and that of the second measured displacement value as $t^*_{SO}$.

If the displacement $x_Z$ is attributed to the first measured displacement value and the displacement $x_O$ to the second measured displacement value, the coordinates of these states appear as shown in a diagram of FIG. 3, in which the displacement in millimeters is indicated on the ordinate and the compensated measured sensor value is entered on the abscissa as follows:

First measured value (clutch closed): $x_Z | t^*_{SZ}$

Second measured value (clutch open): $x_O | t^*_{SO}$

For the calibration method explained above, it is recommended that the coordinate of the first measured value be selected for the first calibration point (A) 14 and the coordinate of the second measured value for the second calibration point (B) 15, and the calibration line 13 is determined with this selection according to the explained calibration method, as shown in FIG. 3.

Figure 5:
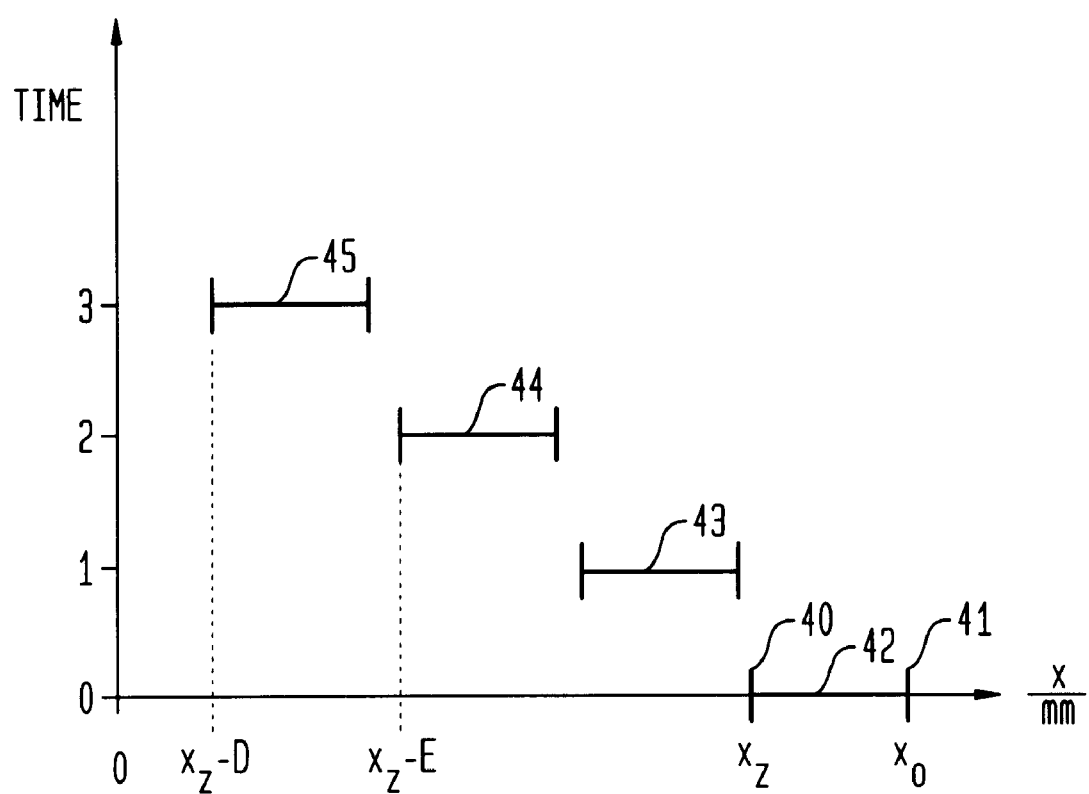
FIG. 5 is a graph of the position of the disengagement window of a clutch at different states of wear.

The disengagement window of a clutch consists of the displacement range for clutch actuation lying between the closed and the open clutch, i.e., within the range between displacement $x_Z$ (see reference designator 40 in FIG. 5) and displacement $x_O$ (see reference designator 41 in FIG. 5).

According to the equation (12), the calibration line 13 is then determined in FIG. 3 as follows:

$$m_E = (x_O - x_Z)/(t^*_{SO} - t^*_{SZ}) = \Delta x_A / \Delta t^*_A \qquad (13)$$

$$x = m_E (t^*_{Sn} - t^*_{SZ}) + x_Z \qquad (14)$$

In the equation (13) the magnitude $\Delta x_A$ represents the displacement width of the disengagement window in millimeters which is determined by the design of the clutch and disengagement mechanism, and the magnitude $\Delta t^*_A$ describes this displacement width as a temperature-compensated normalized time value.

In FIG. 5, the disengagement window is shown at different states of wear. The actuation displacement x in millimeters is entered on the abscissa and four discrete time values determining the state of wear of the clutch, i.e., the values 0, 1, 2 and 3, are entered on the ordinate.

For the time 0 (the abscissa) the installation state applies. As mentioned above herein, the disengagement window 42 lies between the displacements 40 and 41.

In the drawing, the closed clutch 40 has a shorter displacement than the open clutch 41. As explained further below, this depends on the type of assembly of the displacement sensor according to FIG. 6. With the disengagement window 42 of the installation state, the installation tolerances, which may amount to several millimeters, must, among other things, also be taken into consideration.

In clutch operation, the clutch lining is abraded by the slipping processes, i.e., the thickness of the clutch lining decreases, whereby the decrease of the lining thickness within a wide range does not at first affect the functioning of the clutch to any great extent.

Only when the thickness of the clutch lining has become very thin does this result in the failure of a clutch, and as such, this must be avoided.

In an extreme case in which the clutch lining has become equal to zero, no lining is left between the first and the second friction plate, and metal rubs on metal. As a result, no torque can be transmitted any longer from the engine to the transmission. It is important to recognize the danger of such a state in advance, so that the clutch can be replaced prior to such occurrence. At the same time, for reasons of economy, the useful life of a clutch should not be reduced by replacing it too soon.

The invention provides the option of transmitting information to the driver regarding a required clutch replacement, based on the remaining lining thickness representative of the remaining life of the clutch.

As shown in FIG. 5, the disengagement window shifts to lower abscissa values as the wear increases. Thus, the disengagement window 43 applies to time 1, and the disengagement window 44 applies for time 2. For time 3, the disengagement window 45 is shifted to the left by a total of value D, i.e., the original lining thickness (in this state the lining thickness has become zero and the clutch is completely worn).

With the displacement of the disengagement window 45, the displacement x thus appears for the state of the closed clutch:

$$x = x_Z - D \qquad (15)$$

The compensated measured sensor value $t^*_{SV}$ should correspond to this displacement. From this rule and the equations (14) and (15) the following equation results:

$$x_Z - D = m_E (t^*_{SV} - t^*_{SZ}) + x_Z t^*_{SV} = t^*_{SZ} - D/m_E \quad (16)$$

A warning should be transmitted to the driver when the disengagement window has shifted by a value E which is lower than the original lining thickness D because of wear. The remaining lining thickness is then equal to D–E, whereby a suitable value E is selected to correspond to the clutch model.

The compensated measured sensor value of the state of the closed clutch, at which a warning is transmitted to the driver, would be $t^*_{SW}$. A warning is transmitted to the driver when $t^*_{SW}$ assumes the following value (see equation (15) for the derivation):

$$t^*_{SW} = t^*_{SZ} - E/m_E \quad (17)$$

The wear-warning value $t^*_{SW}$ is stored for later utilization during vehicle operation.

As explained below, the magnitude of the wear-warning value $t^*_{SW}$ is compared with that of a value $t^*_1$, which represents the measured displacement value for the closed clutch.

The actuation of a clutch can be carried out in different ways and with the utilization of different technologies. Thus, a clutch can be actuated by the force of the driver's foot in the usual manner by means of a foot pedal, or it can be actuated as a clutch actuated by external force.

Actuation devices exist which are technologically very different from one another, for example, mechanical, hydraulic (in the case of foot operation with or without servo-assistance), as well as pneumatic and electro-motorized embodiments.

The manner in which the first and the second measured values for the two calibration points A and B are adjusted in order to carry out the calibration described above is explained basically through the example of an hydraulic disengagement-actuation device. The method can be used with any other type of actuation device of a clutch, such that, with the exception of special cases, any clutch of a vehicle can be calibrated in the manner described below.

Referring to FIG. 6, the hydraulic actuating device 60 shown can be operated alternatively as a foot-operated or an external-force-operated device. For this purpose, a hydraulic switch-over solenoid valve 63 is provided where the foot operation takes place, shown in the non-actuated starting position.

In the case of foot operation, hydraulic fluid is transmitted via the hydraulic pipe 68, the valve 63 and the hydraulic pipe 69 to the receiving cylinder 62 as a result of the displacement of the piston rod 66 of the transmitter cylinder 61 caused by the foot pedal 64 (foot pedal 64 in the actuated position as opposed to the non-actuated position indicated by broken lines), resulting in the piston rod 67 of the receiving cylinder 62 also being displaced (hydrostatic rod system). The tank 77 acts as a replenishing container in this arrangement.

The piston rod 67 is inierlockingly connected at its free end to the first end of an actuating rod 59 which is interlockingly connected at its second end to the iron core 31 of the displacement sensor.

At a suitable location of the actuating rod 59, a pivot slider joint 49 serves to change the position of the disengagement lever 56, and thereby of the clutch 50. With the above-mentioned displacement of the piston rod 67 as a consequence of an actuation of the pedal 64, the actuating rod 59 is also shifted together with the joint 49, and the disengagement lever 56 is therefore swiveled in rotation to the right, so that the disengagement mechanism further opens the clutch 50.

The central point of the pivot slider joint 49 is particularly well suited to measure the displacement. Concerning this point, the displacements $x_Z$ of the first calibration point 14 and $x_O$ of the second calibration point 15 are also entered in FIG. 6 on axis x. The adjustment of these calibration points shall be discussed further below.

In FIG. 6, a base position $x_Z$ of the center of the joint 49 should represent the completed beginning of the state "clutch closed" which is reached when the clutch is engaged starting from positions of this joint 49 which are further to the right in FIG. 6 and represent the slippage state of the clutch or its "clutch totally open" position.

This base position $x_Z$ of the center of joint 49 will be characterized by greater values $x_Z$ with non-worn clutch friction linings or by smaller values $x_Z$ with worn friction linings, based on the positive direction of axis x of the coordinate of the center of the joint 49 (in FIG. 6). The position $x_O$ of the center of the joint 49, as it is reached starting from the base position $x_Z$ through actuation of the pedal 64 (in FIG. 6 in the sense of a rotation to the left), represents the completed beginning of the "clutch open" state. This position $x_O$ represents a greater entry depth of the iron core 31 into the coil 32 of the displacement sensor 30 than position $x_Z$.

For the actuation through external force, the valve 63 is switched over by energizing the magnet of this valve. In this state, the receiving cylinder 62 is actuated in that an actuation of a disengagement solenoid valve 78 causes hydraulic fluid to be fed into the receiving cylinder 62, whereby the fluid flows through the hydraulic pipe 70, the valve 63 and the hydraulic pipe 69. The disengagement valve 78 is in the form of a 2/2-way valve operating in the switching mode. Hydraulic fluid is fed to the disengagement valve 78 via the hydraulic pipe 71 by means of the hydraulic pump 81 with the help of the hydro-storage 82. The hydraulic pump 81 is supplied in this case through the hydraulic pipe 72 coming from the tank 77.

If the solenoid 75 of the disengagement valve 78 is energized over a time $\Delta t$, a given amount of hydraulic fluid $\Delta V$, which depends on the conveying behavior of the hydraulic pump 81 and on the flow resistance caused by the opening cross-sections of the valves and pipes, flows into the cylinder chamber of the receiving cylinder 62. Due to this expansion of the cylinder chamber, the piston of the receiving cylinder is extended by a displacement increment $\Delta x$. With a piston surface $A_Z$, this displacement increment is:

$$\Delta x = \Delta V / A_Z. \quad (17a)$$

By applying an energizing pulse of a given length to the solenoids of the disengagement valve 78, the actuating rod 59 can thus be extended by a given displacement (extending means extension of the displacement x and the clutch is thereby opened further).

If it is desired that the actuating rod be extended at a given speed, a periodic actuating signal with a given ratio between an energizing pulse time and a pause time which is a function of the desired rod speed must be selected on the solenoids of the disengagement valve 78, as is known for every type of valve operating in the switching mode.

In the case of actuation of the clutch 50 by external force, the clutch is engaged by means of the engagement solenoid valve 79 with 2/2 ways operating in switching mode. If the solenoid 76 of the engagement valve 79 is energized, this valve switches over into pass-through position and hydraulic fluid is transferred from the cylinder chamber of the receiving cylinder 62 via the hydraulic pipes 69, 74, the valve 79 and the hydraulic pipe 73 to the tank 77, whereby the actuating rod 59 is retracted and thereby the lower values x of the position of the center of the joint 49 is reached. At the same time, the piston of the receiving cylinder 62 is pushed to the left by a force oriented towards the left (FIG. 6) which is exerted by the disengagement lever 56 in the joint 49 via the actuating rod 59 upon the piston rod 67, whereby a force directed towards the right by the spring action of the clutch is exerted upon the disengagement lever 56 via the disengagement bearing 57 (in FIG. 6). Here too, by predetermined displacement increments the displacement can be reduced or a predetermined speed can be set. The information given above concerning the disengagement valve 78 also applies for the engagement valve 79.

Hereinafter, it shall be initially assumed that the clutch is pedal-operated, i.e., that the switch-over valve 63 is in its base position. As mentioned above herein, the foot pedal 64 is shown in an actuated position in which the clutch is disengaged. In keeping with the method explained above, which consists in opening the clutch sufficiently so that it is just beyond slipping, the actuation in this case is selected so that the displacement "clutch open" $x_O$ which applies is equal to the second measured value $t^*_{SO}$. The second calibration point (B) 15 is thus defined. One of the two calibration points which, as explained earlier, are required to determine the calibration line 13, is approached by the thus selected actuation (see step 22 in FIG. 4).

The other calibration point, i.e., the first calibration point (A) 14, is approached (see step 18 in FIG. 4) by putting the actuating device 60 in the energy-less state. To do this, the driver releases the pedal. With the release, the displacement "clutch closed" $x_Z$ which is equal to the first measured value $t^*_{SZ}$ applies, because of the explained spring action of the clutch. As a result, the first calibration point A (14) is defined.

The calibration line is defined by means of the two calibration points as explained earlier. It should be noted that the calibration takes place together with the start-up of a clutch with the current installation state. The value $t^*_{SZ}$, which is determined for the first time in this manner, determines the calibration line and thereby also the value $t^*_{SW}$ according to equation (17), when a wear warning is transmitted to the driver.

Upon replacement of a clutch, the calibration is carried out again. The calibration line then represents the installation state of the newly installed clutch.

The displacement x which represents the entry depth of the iron core 31 into the coil 32 is defined by the displacement by which the free edge of the iron core enters the coil. Due to the rigid arrangement of piston rod 67, actuating rod 59 and iron core 31, this displacement occurs at every point of this arrangement. It can also be measured at every point for entry into the electronic computing unit for the calibration described above.

The pivoting position of the disengagement lever 56 rotated to the left when the pedal is released, as explained earlier, is indicated under reference numeral 80 by broken lines (not to scale, and rotation highly exaggerated to show the basic principle). With the position 80 reached after the left rotation of the disengagement lever 56, and indicated by broken lines in FIG. 6, the position $x_Z$, representing the center of the joint 49 which characterizes the completed beginning of the engagement state of the clutch (clutch closed), is also defined.

In the variant of a clutch actuated by external force, the switch-over valve 63 is in its actuated position as indicated above herein. The second measured value for the calibration point (B) 15 is approached by disengaging the clutch via the disengagement valve 78 to the extent explained earlier, thereby defining the second measured point for the second calibration point (B) 15.

To set the first calibration point (A) 14, the actuating device is placed in its non-energized state just as in the case of pedal actuation, but this action is now controlled by valve. The engagement valve 79 is opened, i.e., a static signal is applied on the solenoid 76.

As the engagement valve 79 is opened, the hydraulic fluid is conveyed from the cylinder chamber of the receiving cylinder 62 into the tank, while the actions of the spring 48 and of the disengagement rod system cause the actuating rod 59 to be pushed back to such an extent, as described earlier, that its position corresponds to the state of the engaged clutch. In this manner, the first measured value is defined for the first calibration point (A) 14.

The described setting can be applied to other types of clutch actuation as well. It is essential that the actuating device be placed in a non-energized state for the first measuring point (calibration point A) and that the clutch be opened to the extent described above for the second measured point (calibration point B).

In a particular application the following mechanical measurements and tolerances are found:

| | |
|---|---|
| Displacement sensor 30 measuring range | 95 mm |
| Installation tolerance, displacement sensor 30 | 14 mm |
| Disengagement window (displacement difference $x_o$–$x_z$) | 13 cm |
| Total thickness D of the clutch lining | 12 mm |

The minimum actuating stroke in order to securely open the clutch is equal to the displacement difference of the disengagement window, and such difference now represents only a comparatively small part of the overall measuring range of the displacement sensor. The installation tolerance of the displacement sensor is of similar magnitude to the magnitude of the disengagement window, so that the installation tolerance has a comparatively great influence value. However, the calibration according to the invention eliminates this considerable influence value as described above.

The overall thickness D of the clutch lining is similar in size to the size of the disengagement window.

Should the user desire a wear warning for the monitoring of the state of wear related to this application when the clutch lining thickness has been reduced from its total thickness of 12 mm by 8 mm to 4 mm, for example, he uses the value E=8 in the equation (17) to determine the wear warning value $t^*_{SW}$. This immediately follows calibration.

The state of wear of the clutch is continuously monitored during travel. For such purpose, any suitable point in time is selected when the clutch is engaged (clutch closed). As mentioned earlier, the state of the engaged clutch always applies when the actuating device is not energized. Also as mentioned previously, this is attained, in the case of a driver-operated clutch, when the clutch pedal is released.

Due to the fact that the actuating device is in an energy-less state most of the time, the state of wear is measured at non-critical times when the evaluation system is not engaged in time-critical tasks.

At the selected point in time (the alternative is continuous measuring in the background with engaged clutch) the entry depth of the iron core 31 into the coil 32 is measured, and this first yields a measured value ti which is applicable for the temperature $\vartheta$.

This measured value $t_1$ is temperature-compensated in accordance with the explained compensation method so that the value $t^*_1$ ($t_1(\vartheta_B)$) results.

The evaluating system compares this value $t^*_1$ with the wear warning value $t^*_{SW}$ according to equation (17) and generates a wear warning for the driver if the value $t^*_{SW}$ is reached or if the result is even below it:

$$t^*_1 \leq t^*_{SW} \tag{18}$$

In addition to the task of wear recognition, the clutch sensor can also be used to recognize the disengaged state of a partially or fully automatic transmission.

For such purpose, the temperature-compensated measured value $t^*_1$, which represents a given state of wear of the engaged clutch (clutch closed), is taken as a basis. According to equation (19) a displacement $x_1$ is equal to this measured value:

$$x_1 = m_E (t^*_1 - t^*_{SZ}) + x_Z \tag{19}$$

The condition for the disengaged clutch is met when a value $x_2$ applies which is increased over the value $x_1$ by the displacement width $\Delta x_A$ of the disengagement window:

$$x_2 = x_1 + \Delta x_A \tag{20}$$

By inserting the relationship of equation (13) into equation (20), the following result is obtained:

$$x_2 = m_E (t_1 - t_{SZ}) + x_Z + \Delta t^*_A = m_E (t^*_1 + \Delta t^*_A - t^*_{SZ}) + x_Z \tag{21}$$

With this relationship, the temperature-compensated measured sensor value $t^*_2$ is obtained for the state of the sufficiently disengaged clutch, equal to the completed beginning of the disengagement state described earlier, as the measured sum value which serves as a comparison value to find this state:

$$t^*_2 = t^*_1 + \Delta t^*_A \tag{23}$$

Thus, when a shifting desire is announced from a transmission control for a partially or fully automatic transmission, the evaluation system will measure the displacement at the sensor in short intervals and will compare it with the measured value $t^*_2$ according to equation (23). As soon as this value has been reached, the message "clutch open" is transmitted by the evaluation system to the transmission controls so that the gearshifting operation may be carried out.

As explained earlier herein, the sensor is scanned at similar short intervals in the case of a shifting request. In order to arrive at a decision on the disengaged clutch, short computing times are required, and in this case it would take too long to carry out the temperature compensation on an iterative basis.

In this case it is possible to dispense with the iteration since the displacements $x_2$ and $x_1$ are close together as compared to the overall displacement measuring range, and therefore the temperature coefficient which was found by iterative means for the displacement $x_1$ can also be used for the displacement $x_2$ with close approximation. To convert the non-compensated measured value $t_2(\vartheta)$ into the temperature-compensated measured value $t^*_2$, the value $T_{Kn}$ is used at which $t^*_1$ was found in the preceding iterative calculation as an approximate value of the measured sensor value $t^*_1$ (see FIG. 2, step 5). This temperature coefficient was determined at non-critical times, as explained, and it was stored and is available for the now time-critical conversion. By using this temperature coefficient the temperature-compensated measured total value $t^*_2$ is determined according to:

$$t^*_2 = t_2/(1 + T_{Kn}(\vartheta - \vartheta_B)) \approx t_2(1 - T_{Kn}(\vartheta - \vartheta_B)) \tag{24}$$

What is claimed is:

1. A method for determining a temperature-compensated measured value and for calibration of a displacement sensor designed as an inductive displacement sensor, comprising:

measuring at least one of the displacement sensor temperature and an environmental temperature thereof to obtain a measured temperature at a time of measuring;

determining a measured sensor value applicable at said measured temperature;

determining a temperature coefficient which is at first unknown by using a first function and a second function, the first function being based on the temperature-dependency of the measured sensor value, and the second function being based on the known dependency of the sensor temperature coefficient on the measured sensor value at a reference temperature, wherein the dependency of the temperature coefficient is based on a particular sensor model, said step of determining including solving the two functions using iteration;

temperature-compensating the measured sensor value to form a temperature-compensated measured sensor value by converting the measured sensor value into the measured sensor value applicable at the reference temperature using the temperature coefficient applicable to the sensor and the temperature difference between the measured temperature and the reference temperature; and converting said temperature-compensated measured sensor value into a measured value with a mechanical length unit through calibration.

2. A method according to claim 1, wherein:

the first function is determined by the mathematical relationship between the temperature-dependency of the measured sensor value according to the measured sensor value at the reference temperature; and the second function is determined by the mathematical relationship of the dependency of the sensor temperature coefficient on the measured sensor value according to the temperature coefficient.

3. A method according to claim 2, wherein said iteration includes:

initially assuming a suitable temperature coefficient for the first function;

inserting a result of the calculation according to the first function and a measured sensor value into the second function which thereby leads to an improved temperature coefficient; and in a series of steps, inserting the result of each calculation according to the first function into the second function, and inserting the result of each calculation according to the second function into the first function, until a break-off criterion has been reached, the break-off criterion being reached when the result from one calculation according to the second function, or the result from one calculation according to the first function, differs from the results obtained from the immediately prior calculation by less than a predetermined magnitude.

4. A method according to claim 1, wherein a calibration line which is defined by a first and a second calibration point is used for said calibration.

5. A method according to claim 4, wherein the displacement sensor is used to measure the displacement of a disengagement-actuation device of a vehicle clutch.

6. A method according to claim 5, wherein:
said calibration is performed when a vehicle clutch is initially put into service;
the first calibration point is determined by a displacement for a completely engaged clutch; and
the second calibration point is determined by another displacement for the beginning of a completely disengaged clutch.

7. A method according to claim 6, wherein a determination as to a state of the completely engaged clutch is made by placing the disengagement-actuating device in an energy-less state.

8. A method according to claim 7, wherein a displacement which changes as a function of wear is determined during vehicle operation for the completely engaged clutch.

9. A method according to claim 8, wherein a wear warning value is set which corresponds to a particular displacement at which a remaining lining of the clutch has a given thickness.

10. A method according to claim 9, wherein a wear warning to the driver is triggered when the displacement for the completely engaged clutch, which changes as a function of wear, is no greater than the wear warning value.

11. A method according to claim 1, wherein said iteration to determine the temperature coefficient for the measured temperature is dispensed with for a particular measured sensor value which, in relation to an overall measuring range, is at a comparatively short displacement from another measured sensor value, and instead, a known temperature coefficient of the other measured sensor value is used.

12. A method according to claim 1, wherein the temperature coefficient applicable to the sensor displacement at the measuring temperature is determined at non-critical times of operation.

13. A method according to claim 12, wherein the temperature coefficient, which is determined at non-critical times, is stored in a memory to be available there for time-critical calculations.

14. A method according to claim 6, wherein a total measured value is formed from the temperature-compensated measured sensor value for the completely engaged clutch and the displacement width of a disengagement window as a temperature compensated and standardized time value, said total measured value being used as a comparison value for the determination of a state of a sufficiently disengaged clutch.

15. A method according to claim 14, wherein the temperature coefficient of the measured sensor value for the engaged clutch is used for the temperature compensation of the total measured value.

* * * * *